United States Patent [19]

Batchen et al.

[11] Patent Number: 4,865,077

[45] Date of Patent: Sep. 12, 1989

[54] L.P.G. HOSE BREAKAWAY COUPLING

[75] Inventors: David J. Batchen, Pymble; Francesco Capilli, Ryde, both of Australia

[73] Assignee: D. J. Batchen Pty. Limited, Auburn, Australia

[21] Appl. No.: 197,362

[22] Filed: Apr. 15, 1988

[30] Foreign Application Priority Data

Apr. 16, 1987 [AU] Australia ................................ PI1510

[51] Int. Cl.⁴ ........................ F16L 37/28; F16L 35/00
[52] U.S. Cl. ..................................... 137/614.04; 285/1
[58] Field of Search ............... 137/614, 614.03, 614.04; 285/1

[56] References Cited

U.S. PATENT DOCUMENTS

| | | | |
|---|---|---|---|
| 2,730,380 | 1/1956 | Espy et al. | 137/614.04 |
| 2,806,716 | 9/1957 | Brown | 285/1 |
| 3,201,147 | 8/1965 | De Cenzo | 285/1 |
| 3,435,848 | 4/1969 | Johnston | 285/1 |
| 4,124,228 | 11/1978 | Morrison | 285/1 |
| 4,485,845 | 12/1984 | Brady | 137/614.04 |

Primary Examiner—A. Michael Chambers
Attorney, Agent, or Firm—Townsend and Townsend

[57] ABSTRACT

The present invention relates to a L.P.G. hose breakaway coupling which is adapted to separate at a predetermined force. The coupling comprises two internal valves located on each side of the coupling which automatically seal each half of the coupling upon disconnection. The coupling is lightweight in construction when compared to existing devices and is simple in operation as well as being robust in construction. The two halves of the coupling are connected by releasing a bias member and directly coupling the two halves of the coupling together and then resetting the bias member to load the release mechanism.

6 Claims, 3 Drawing Sheets

L.P.G. HOSE BREAKAWAY COUPLING

The present invention relates to an L.P.G. hose breakaway coupling.

With the advent of L.P.G. powered vehicles, L.P.G. dispensers were developed which were, by necessity, coupled to the fuel tanks of vehicles in a gas-tight manner. This connection is quite rigid and if the operator of the vehicle omits to disconnect ths coupling and drives off, serious damage can occur to the dispenser or hoses with leakage of fuel, with its resultant fire hazzard.

To overcome these problems, L.P.G. hose breakaway couplings were developed so that, if force of a predetermined strength was exerted on the hose, from the dispenser, when it was connected to a fuel tank of a vehicle, the coupling separated, sealing each side of the coupling and preventing the loss of fuel.

However, the prior art hose breakaway couplings were not completely successful. The present invention therefore seeks to ameliorate the disadvantages of the prior art.

In one broad form the invention comprises an L.P.G. hose breakaway coupling comprising:

a first gas nozzle means and a second gas nozzle means each having a respective internal valve seat and a respective spring loaded ball valve adapted to seal in a gas tight manner on said its valve seat;

a spacer member associated with one of the said gas nozzles such that when the said first and second gas nozzles are forced into sealing engagement, each of the said ball valves are forced out of sealing engagement with their respective seats, by said spacer member;

an intermediate sleeve which surrounds said two nozzle members which such first and second gas nozzles are in sealing engagement, said sleeve having at least one opening therein containing a locking member, and said first gas nozzle containing a recess to receive said locking member;

a second sleeve adapted to surround said intermediate sleeve, and having at least one recess there is in its internal surface;

a third sleeve which surrounds and is attached by a screw thread to said intermediate sleeve remote from said second sleeve;

a biasing means adapted to extend between said second sleeve and said third sleeve whereby when said first and second nozzles are in a sealing engagement and said third sleeve member is screwed to its locking position along said intermediate member, said biasing member is compressed to a predetermined loading wherein said second sleeve holds said locking member(s) in said at least one opening in said intermediate sleeve and said recess of said first nozzle locking said nozzles, in sealing engagement, whereby when a force is exerted across the coupling greater than the predetermined loading of the biasing member, the first nozzle and the intermediate sleeve move longitudinally within the second sleeve, wherein said locking member(s) withdraws into a respective recess of the at least one recess in the second sleeve, allowing the first nozzle to disengage from the intermediate member and hence separate from the breakaway coupling.

Because the L.P.G. seal is internal, the seal is not damaged when the disconnected nozzle is dragged along the ground. Further, the nozzle when disconnected is much less bulky than existing units and is less likely to cause damage when being dragged behind a vehicle. As the unit is a snap on connection there is no tendency for twists in the hose to cause one half of the coupling to unscrew relative to the other with consequential reduction in flow rates. The invention will now be described with reference to the accompanying drawings in which.

Figure 1:
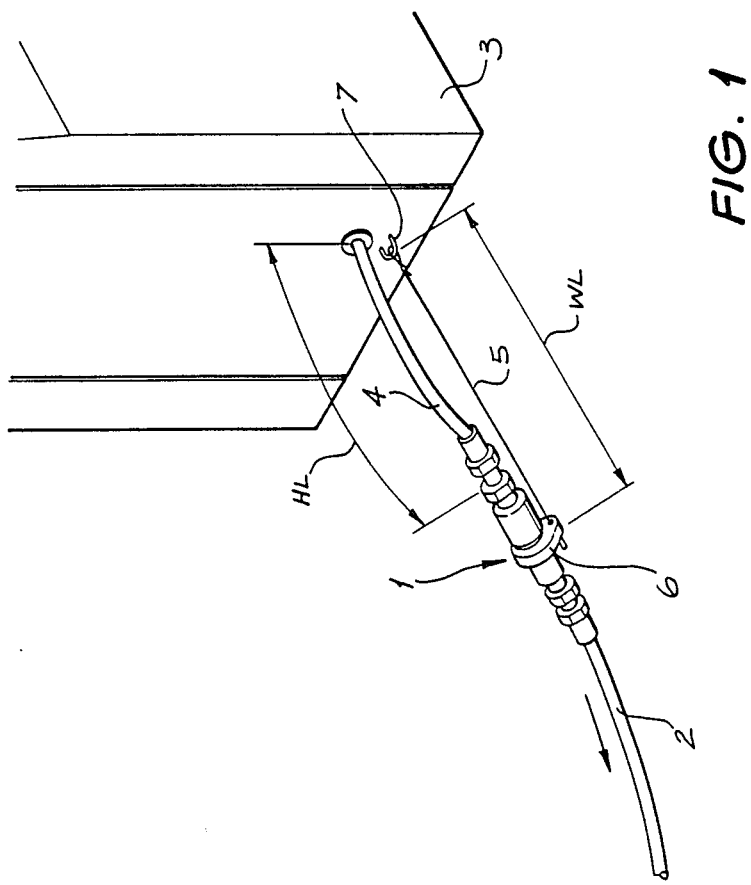
FIG. 1 illustrates the connection of the coupler to a dispensing unit.

A breakaway coupling 1 of one embodiment of the present invention is shown connected in the hoseline 2 of an L.P.G. dispensing unit 3 adjacent to the base of the unit. The length of hose 4 connecting the coupling to the base of the unit is longer than the length of the restraining wire 5 which is connected from a collar 6 of the coupling 1 to an anchor point 7 on the dispensing unit 3. Preferably the length of the restraining wire is 50 mm shorter than the length HL of the hose 4, such that when tension is applied to the coupling the restraining wire 5 is tensioned rather than the hose 4.

Figure 2:
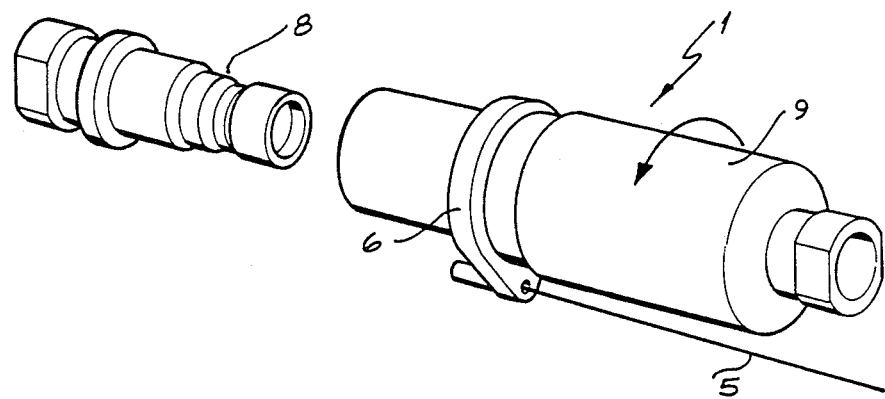
FIG. 2 illustrates the breakaway coupling unit of one embodiment of the present invention in its unlocked position.
Figure 3:
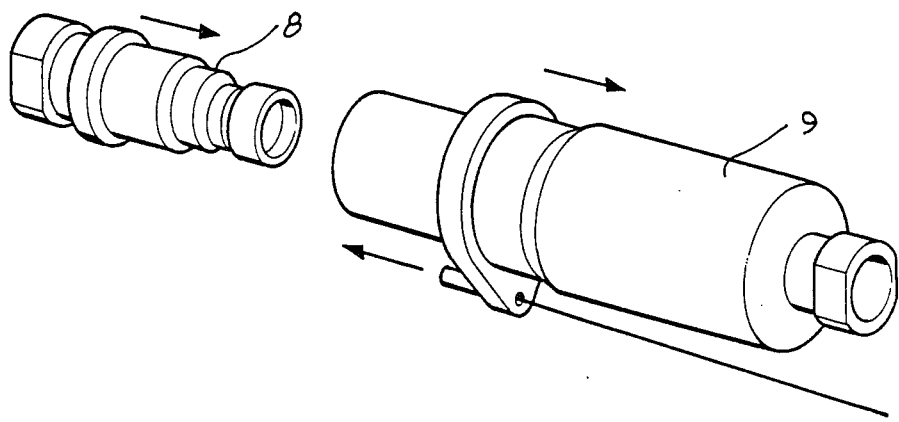
FIG. 3 illustrates the embodiment shown in FIG. 2 being coupled.
Figure 4:
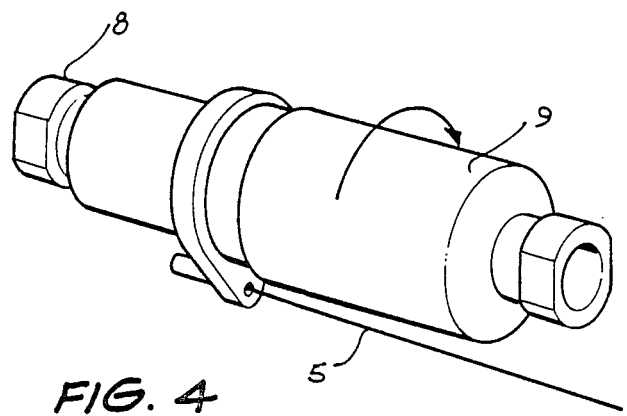
FIG. 4 illustrates the coupling of the above embodiment in its coupled position.

To connect the discharge nozzle 8 to the breakaway coupling 1 the outer sheath 9 is rotated in an anti-clockwise position until it reaches its stop, as shown in FIG. 2. The collar 6 is pulled back and the nozzle 8 is inserted as shown in FIG. 3. The sheath 9 is rotated, locking the nozzle 8 into position, as shown in FIG. 4. The breakaway coupling 1 is therefore connected such that a separation force of approximately 25 Kg, at 1500 kPa internal pressure, will separate the connector.

Figure 5:
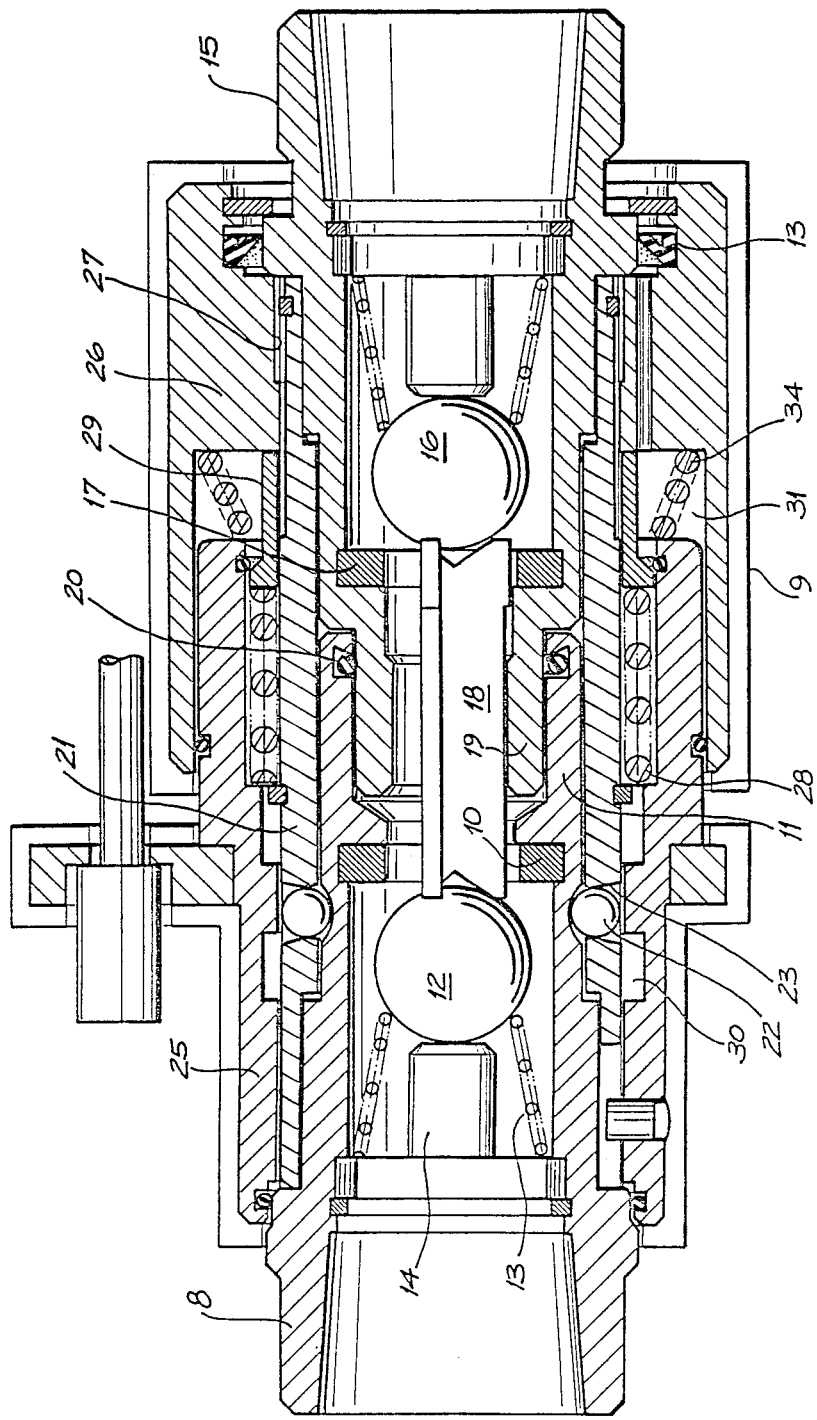
FIG. 5 shows a sectional view of the coupling of the above embodiment showing the internal components in the sealing engagement.

The specific construction of the coupler of one embodiment of the present invention is shown in FIG. 5. The discharge nozzle 8 comprises an internal valve seat 10 located behind the neck 11. A ball valve 12 is biased by spring means 13 to sealingly engage on the internal valve seat 10. When the ball valve 12 is forced from the valve seat 10 it rests against a stop 14.

The construction of the inlet nozzle 15 involves a similar valve arrangement utilizing a ball valve 16 and an internal valve seat 17. However, the inlet nozzle 15 also comprises a spacer member 18 which extends through the outlet neck 19 for limited movement within the neck 19. The neck 19 of the inlet nozzle 15 mates within the neck 11 of the discharge nozzle, with sealing means 20 to provide a gas-tight seal between the two necks.

With the nozzles 8 and 15 in their sealing position the spacer member 18 forces both ball valves 12 and 16 off their respective valve seats 10 and 17, allowing substantially uninterrupted flow of L.P.G. through the coupling 1.

Surrounding the junction of the two nozzles is an intermediate sleeve 21. This sleeve 21 is adapted to be connected to the discharge nozzle 8 by locking means in the form of ball bearings 22 which seat in a recess 23 in the intermediate sleeve and lock into a recess 24 in the discharge nozzle. A second sleeve 25 surrounds the intermediate sleeve adjacent the discharge nozzle 8. The second sleeve 25 holds the ball bearings 22 into locking engagement between the second sleeve 25 and the discharge nozzle 8.

A housing 26 surrounds the intermediate sleeve 21 adjacent the inlet nozzle 15. This housing 26 is threadedly connected via threads 27 to the intermediate sleeve 21.

A spring member 28 is located between the second sleeve 25 and an annular member 29. When the outer sleeve 9 which is rigidly affixed to the housing 26, is rotated as shown in FIG. 4, the housing 26 moves along the intermediate sleeve 21 and forces the annular member 29 on to the spring member 28 compressing the spring to its predetermined loaded position. In this position the second sleeve 25 is positioned so as to lock the discharge nozzle 8 to the intermediate sleeve 21 by means of the ball bearing 22 engaging in the concave recess 24 of the nozzle 8. The intermediate sleeve 21 is itself locked to the housing 26.

When tension is applied to the discharge nozzle, if a user forgets to disconnect the outlet hose from his fuel tank and attempts to drive away, the force is transmitted via the ball bearing 22 to the intermediate sleeve 21 which forces the housing 26 to further press the spring member 28 whereby the intermediate sleeve 21 moves axially of the second sleeve 25.

In doing so, the recesses 30 in the second sleeve 25 line up with the recesses 23 in the intermediate member 21 and the concave recess 24, in the discharge nozzle 8, forces the ball bearing out of engagement and into the recess 30, thereby freeing the discharge nozzle 8 from the breakaway coupling 1. As soon as this occurs the respective ball valves 12 and 16 sealingly engage their respective valve seats 10 and 17, closing off both halves of the coupling. Because of the particular shape of the spacer member 18 there is only a minimal loss of gas as only 7 mL of liquid is trapped between two halves of the coupling.

The coupling can be reconnected without emptying the base 4 connected to the inlet nozzle 15. This is very important because no L.P.G. is discharged during reconnection.

Reconnection can be achieved by relocation of the tension on spring 28 by rotation of the sheath 9 and the housing 26, anticlock wise relative to the second sheath 25. The discharge nozzle 8 is inserted so that the sealing means 20 seals around the neck 19 before the valves 12 and 16 are forced off their seats 10 and 17. The re-engagement of the balls 23 in the groove 24 by relative displacement of the collar 6 and the second sheath 25, ensures engaging of the nozzle 8 to the inlet nozzle 15, with the clockwise rotation of housing 26 compressing the spring 28 and forcing the valves 12 and 16 off their seats to allow flow between the inlet and outlet nozzles 15 and 8 respectively.

If for any reason the sealing means 20 fails, the space 31 would be pressurized to the pressure of the L.P.G. and as such the housing 26 could be prevented from moving relative to the secondary sleeve 25. To prevent this from happening, a bore 32 connects the space 31 to atmosphere via a lip seal 33, whereby the coupling can be disconnected sealing both halves.

O-rings seals are located at respective positions between the various components to prevent the ingress of water.

As shown in FIG. 3 with the outer sleeve 9 rotated to its fully opened position, the collar 6 can be pushed back against the springs 34 which aligns the recesses 30 in the second sleeve 25 with the recesses 23 in the intermediate sleeve 21 whereby the ball bearings 22 are forced out of the way by the nozzle 8 to allow the nozzle 8 into sealing engagement. When the collar 6 is released, the recesses 30 on the second sleeve 25 move out of alignment forcing the ball bearings 22 to engage the intermediate sleeve 21 with the discharge nozzle 8.

The present invention therefore provides an L.P.G. hose breakaway coupling which is lightweight in construction, utilizes internal valves on both halves of the coupling and is simple in operation, involving a snap lock connection and separation. Embodiments of the present invention provide the following advantages:

1. Reconnection of the coupling without loss of LPG.
2. Simplicity of valve design using balls.
3. Small loss of liquid on separation - approx. 7 ml.
4. Coupling does not separate with increasing internal hydrostatic pressure in the event that external atmospheric temperature increases.
5. Coupling does not tend to undo due to twisting of hose, and there is no loss of flow capacity resulting from hose twisting.
6. Seal is internal is disconnected nozzle and is therefore not damaged when nozzle is dragged along the ground.
7. Nozzle which is disconnected is much less bulky than existing units and is less likely to cause damage when dragged behind a vehicle.
8. Coupling is sealed at all points of water ingress thereby contributing to its long working life.
9. Damaged 'O' ring seal will not prevent coupling from functioning correctly due to unique pressure relieving seal item 33. It should be obvious to people skilled in the art that modifications can be made to the above description without departing from the scope and spirit of the present invention.

We claim:
1. An L.P.G. hose breakaway coupling comprising:
a first gas nozzle means and a second gas nozzle means each having a respective internal valve seat and a respective spring loaded ball valve adapted to seal in a gas tight manner on said its valve seat;
a spacer member associated with one of the said gas nozzles such that when the said first and second gas nozzles are forced into sealing engagement, each of the said ball valves are forced out of sealing engagement with their respective seats, by said spacer member;
an intermediate sleeve which surrounds said two nozzle members when such first and second gas nozzles are in sealing engagement, said sleeve having at least one opening therein containing a locking member, and said first gas nozzle containing a recess to receive said locking member;
a second sleeve adapted to surround said intermediate sleeve, and having at least one recess therein in its internal surface;
a third sleeve which surrounds and is attached by a screw thread to said intermediate sleeve remote from said second sleeve;
a biasing means adapted to extend between said second sleeve and said third sleeve whereby when said first and second nozzles are in a sealing engagement and said third sleeve member is screwed to its locking position along said intermediate member, said biasing member is compressed to a predetermined loading wherein said second sleeve holds said locking member(s) in said at least one opening in said intermediate sleeve and said recess of said first nozzle locking said nozzles, in sealing engagement, whereby when a force is exerted across the coupling greater than the predetermined loading of the biasing member, the first nozzle and the intermediate sleeve move longitudinally within the second sleeve, wherein said locking member(s) withdraws into a respective recess of the at least one recess in the second sleeve, allowing the first nozzle to disengage from the intermediate member and hence separate from the breakaway coupling.

2. An L.P.G. hose breakaway coupling according to claim 1 wherein there is provided a chamber within the third sleeve along which the second sleeve is adapted to slide sealingly therewith and a bleed hole in the third sleeve to prevent pressurising of the chamber which would prevent movement of the second sleeve relative to the third sleeve.

3. An L.P.G. hose breakaway coupling according to claim 1 wherein each of said locking members comprise a ball and each of said openings in said sleeve are tapered towards the first nozzle, to allow each ball to project out of the respective opening on said sleeve, while being prevented from falling completely through said opening, such that the second sleeve bears against each ball causing said ball to project through the respective opening in said intermediate sleeve to mate in said recess in the first gas nozzle.

4. An L.P.G. hose breakaway coupling according to claim 2 wherein said biasing means is a compression spring located within the chamber of the third sleeve.

5. An L.P.G. hose breakaway coupling according to claim 3 wherein there is provided a chamber within the third sleeve along which the second sleeve is adapted to slide sealingly therewith and a bleed hole in the third sleeve to prevent pressurising of the chamber which would prevent movement of the second sleeve relative to the third sleeve.

6. An L.P.G. hose breakaway coupling according to claim 5 wherein said biasing means is a compression spring located within the chamber of the third sleeve.

* * * * *